United States Patent [19]
Quinn et al.

[11] 3,779,423
[45] Dec. 18, 1973

[54] PHOTOGRAPHIC SLIDE DISPENSER

[75] Inventors: Peter T. Quinn, Englewood; Bruce W. Schroeder, Littleton, both of Colo.

[73] Assignee: Honeywell Inc., Minneapolis, Minn.

[22] Filed: Jan. 6, 1972

[21] Appl. No.: 215,728

[52] U.S. Cl. .............................................. 221/186
[51] Int. Cl. ............................................ B65g 59/06
[58] Field of Search ..................... 221/186, 187, 276

[56] References Cited
UNITED STATES PATENTS

| | | | |
|---|---|---|---|
| 2,701,722 | 2/1955 | Bone | 221/186 X |
| 2,792,968 | 5/1957 | Cassady | 221/276 |
| 1,170,705 | 2/1916 | Swift | 221/276 X |

Primary Examiner—Stanley H. Tollberg
Attorney—Arthur H. Swanson et al.

[57] ABSTRACT

A slide dispenser including a slide box slidably supported in an inclined recess in a support member and having slots in the top and bottom front wall and rear bottom wall thereof. Detents on the box cooperate with spring means to allow limited sliding movement of the box while retaining the box in the recess. A slide pusher carried by the support member extends through the slot in the rear wall of the box and abuts against an edge of the bottom slide whereby sliding movement of the box causes the opposite edge of the bottom slide to be pushed through the slot in the bottom front wall of the box.

10 Claims, 4 Drawing Figures

PATENTED DEC 18 1973　　　　3,779,423

PATENTED DEC 18 1973

PHOTOGRAPHIC SLIDE DISPENSER

BACKGROUND OF THE INVENTION

Slide boxes that have heretofore been used for storing slides have open portions through which a stack of slides can be inserted and stacked so that the marginal supporting edges of these slides can be held in tight compact physcial contact with one another. When it is desired to review these slides in a viewer to select the slides, that are to be shown at a future time on a viewer screen or a projector screen, it has herefore been necessary to remove the entire stack from the box and to manually place one slide at a time in the viewer to view each slide. It is then necessary to manually sort out those that are desired to be shown from those not to be shown on, for example, the table on which the viewer is supported. After this manual sorting operation has taken place, the selected slides are then normally placed one at a time in a magazine for showing in a projector or are manually returned to the slide box for storage and for showing at some future time in the slide viewer.

PROBLEMS

One of the problems involved in manually transferring selected slides from a slide box to a viewer and back on a selected basis into one or more magazines, is that since fingers are employed to grasp the emulsion side of the slides they leave finger print thereon.

Another problem that occurs when slides are handled manually in the aforementioned manner is that dog ears are formed on slide corner portions of the slides which will cause jamming to occur when they are used in a projector.

Another problem is the extensive amount of time that is required to pick up the slides from a table during the forementioned sorting operation.

SOLUTION

In order to reduce the aforementioned fingerprint and dog ear damage to slides, it is necessary to provide an apparatus that will eliminate the need for sorting slides in the formentioned manner.

This is accomplished by providing a notched out recess in the top of the table viewer into which a slide box can be inserted and by providing a spring biasing means extending between the housing of the table viewer and the slide box to maintain the box in a spaced apart static position with respect to the rear wall of the notched out part of the viewer housing.

Furthermore, by providing a stationary pusher pushed through a rear base portion of the box and into contact with the lower most slide in the box it will be possible to allow the bottom slide to have only its forward marginal supporting edge gradually exposed in front of the box as the slide box is manually pulsed inwardly against the bias of the spring biasing means toward the rear wall forming a cavity in the viewer.

It can thus be seen that the marginal edge of each one of the stack of slides in the slide box is positioned in an ideal manner for gripping between two fingers in front of the slide box and without allowing fingerprints to be imprinted on the emulsion side of the slide and and when each of these slides reaches the base of the slide box and the box is pushed toward the rear wall of the cavity. If it is thereafter desired to return any one of the withdrawn slides to the top of the stack it can readily be accomplished by inserting the slide at an angle through an opening in the upper front portion of the slide box and thereby allow it to be added to the top of the stack of slides already stored therein.

The box is also provided with a flexible hinged door at its front end so that the stack of slides can be inserted as a unit into the slide box.

The slide dispensing apparatus to be hereinafter described therefore, not only eliminates the possibility of all dog earing and fingerprints from being imprinted on the emulsion side of the slide, but also eliminates the heretofore mentioned time consuming problem of picking up the slides from a table and carrying them over to the slide viewer.

BRIEF DESCRIPTION OF THE DRAWING

A better understanding of the present invention may be had when the following detailed description is read in connection with the accompanying drawing in which.

DETAILED DESCRIPTION

Figure 1:
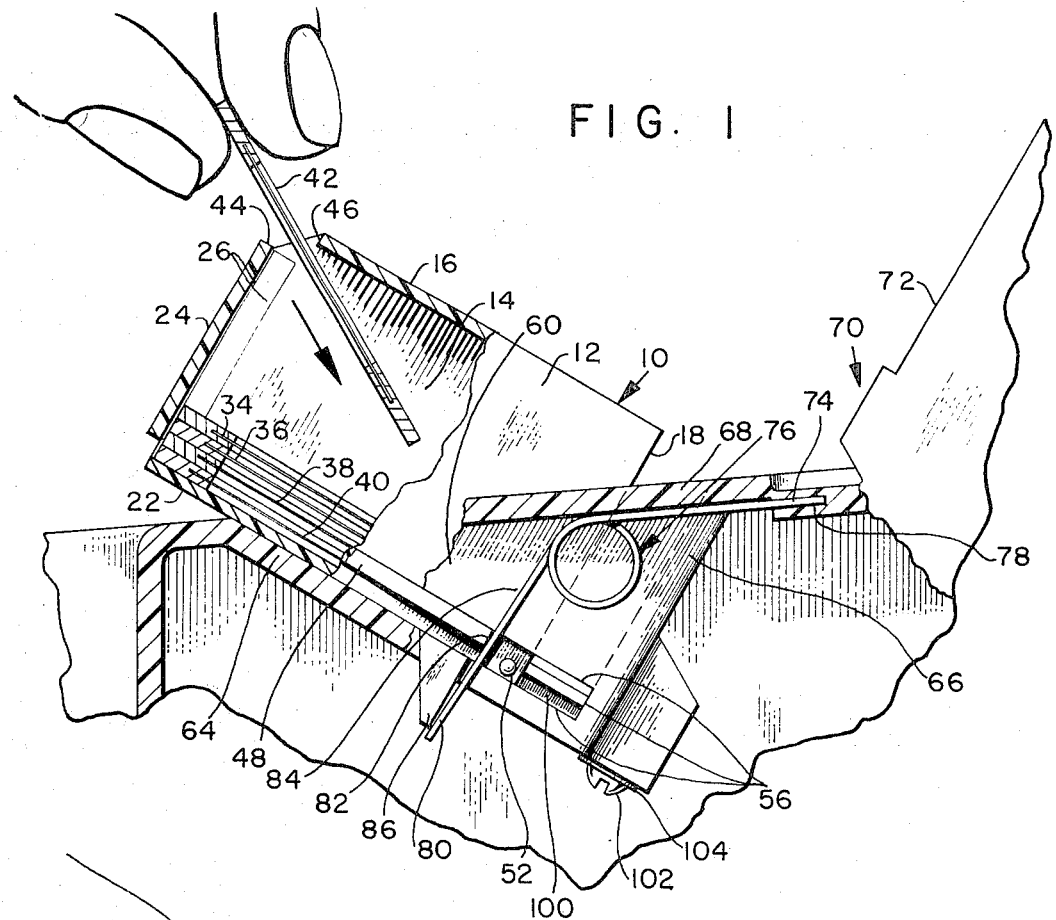
FIG. 1 shows the position of the slide box when it is mounted in a static position in a v-shaped notched out housing of the viewer and the position in which the spring biasing means and a detent on the side of the box is in during this static position.
Figure 4:
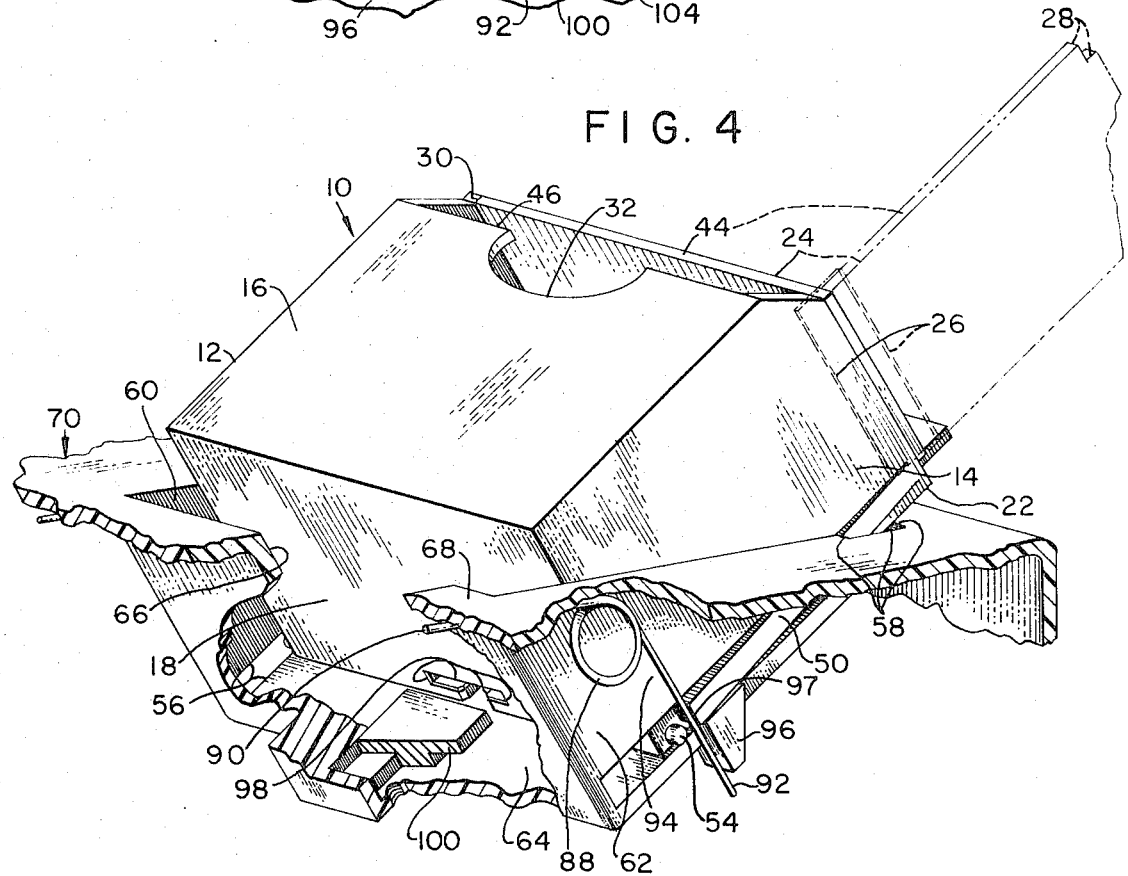
FIG. 4 shows an isometric rear, right side view of the slide box returned to the position shown in FIG. 1 and further shows how the stationary T-shaped pusher mounted on the viewer is aligned with the T-shaped slot in the rear of the slide box.

FIGS. 1 and 4 show a slide box 10 having two side walls 12, 14, a top wall 16, a rear wall 18, a bottom wall 22 and a front wall 24.

The front wall 24 of the slide box 10 is shown connected at one end by means of a flexible hinge 26 to a left inner side wall surface of the slide box 10. The other end of the front wall has right edge portion 28 that can be brought into contact with the top and bottom end portions of a U-shaped slotted out front edge portion 30 of the right side 12 of the box 10.

When an operator places a finger down through the slot formed in the wall portion 32 of the top of box 10 and then onto the top edges of the front wall 24 and a slight force is exerted in a forward direction the wall 24 can be moved about hinge 26 from its closed solid line position to its fully opened dot-dash position as shown in FIG. 4.

A stack of slides, for example, slides 34, 36, 38, 40 can then be loaded into this box 10 through the opened door forming the front wall 24 and into the position shown in FIG. 1.

FIG. 1 shows that the box 10 can also be loaded by inserting individual slides, for example, slide 42 into the box through an opening formed between the top edge portion 44 of the front wall 24 and the front edge 46 of the top wall 16 of box 10.

The aforementioned slide box 10 is maintained in its static, FIG. 1, position by sliding the box 10 and its tapered, guiding ribs 48, 50 and hemispherical dentent 52, 54 along the walls 56, 58 that forms slots on the left and right wall portion 60, 62.

The wall 60, 62 together with the inclined walls 64, 66 form a notched out cavity in the housing 68 of the table viewer 70 which in turn is provided with a viewing screen 72.

One end portion 74 of a coil spring 76 is shown in FIG. 1 mounted in a fixed manner in a wall portion 78 of the table viewer housing 68. The end 80 of the coil spring 76 is shown in a position after it has been slid outwardly and past the outer semi-spherical shaped end of detent 52. In this position the spring end 80 protrudes downwardly and in contact with the rear edge 82 of the rib 48. The lower most portion of the end 80 of the spring 76 is shown passing in a downward direction along the inner side wall surface portion 84 of the sidewall 60 and into spring biasing engagement with a stop member 86.

The aforementioned stop member 86 forms an integral part of the wall 64 of the viewer 70 and is shown protruding in a downward direction from its associated wall 64.

Another coil spring 88, that is similar to the coil spring 76 just described, is employed on an opposite inner surface of sidewall 62 as is best shown in FIG. 4. One end 90 of the spring 88 is mounted in a fixed manner in the viewer housing 68 similar to end 74 of spring 76 and a remaining end portion 92 protrudes downwardly along the inner surface 94 of the wall 62 through the slotted wall 58 and into contact with the stop 96 and the inner end 97 of the rib 50.

Figure 3:
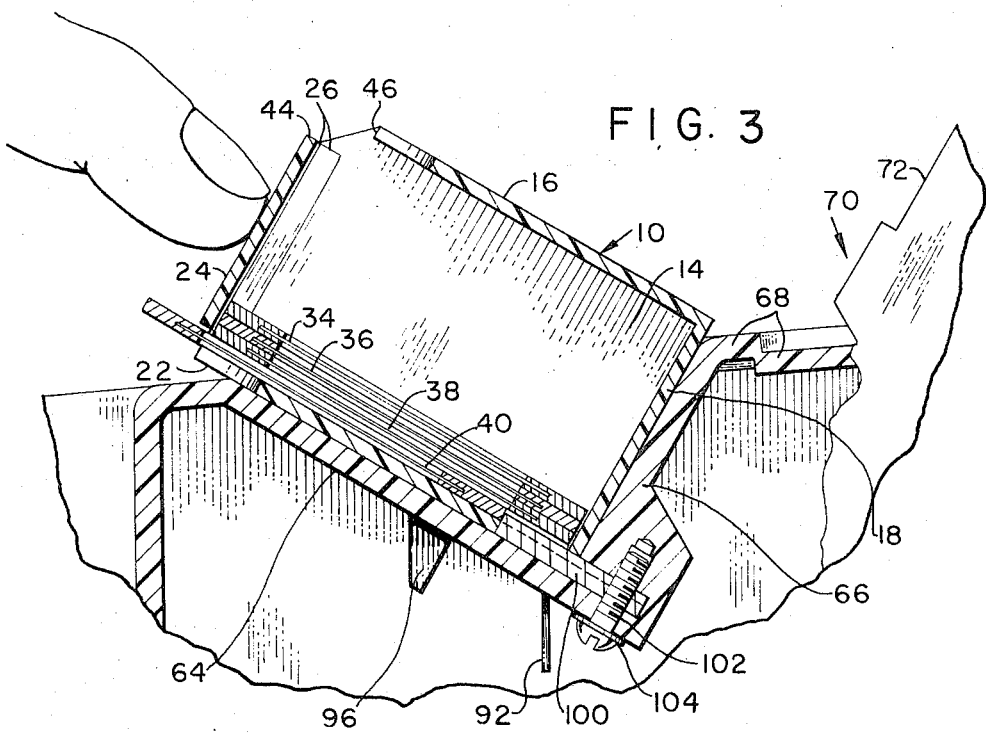
FIG. 3 shows a sectional view taken through the center of the box when it is in the same position as that shown in FIG. 2 in order to show how the stationary pusher has retained the lower most slide in the slide box in a fixed position after the slide box and its remaining slides have been moved to the position shown in FIG. 2

A T-shaped slotted out wall portion 98 is formed in the base of the slide box 10 for slidably engaging a T-shaped slide pushing member 100. This slide pushing member 100 can be an integral part of the wall 64 or a separate part as shown in FIG. 3 which is fixedly connected by a threaded connecting screw member 102 and spring washer 104 to the housing 64, 66 of the viewer 70.

OPERATIONS

A stack of slides, for example, 34–40, are loaded into the slide dispensing box 10. The box 10 is then mounted on the front portion of the base 64 of the viewer 70 and between its side wall 60, 62 which forms the upper housing of this viewer 70.

As the box 10 is moved in a rearward direction towards its static position as shown in FIGS. 1 or 4 the semi-spherical heads formed on the top surface of the detents 52, 54 will be brought into contact with and be allowed to slide past the ends 80, 92 of the springs 76, 88 with which they are associated.

The ends 80, 92 of the springs 76, 88 will thus be moved outward and away from their associated sidewalls 60, 62 and then be allowed to return to their position as shown in FIG. 1. The mounting margin portion of the additional slides, for example, slide 42 can be gripped between the fingers and loaded in the manner shown while the slide box 10 is in the static position as shown in FIG. 1.

Figure 2:
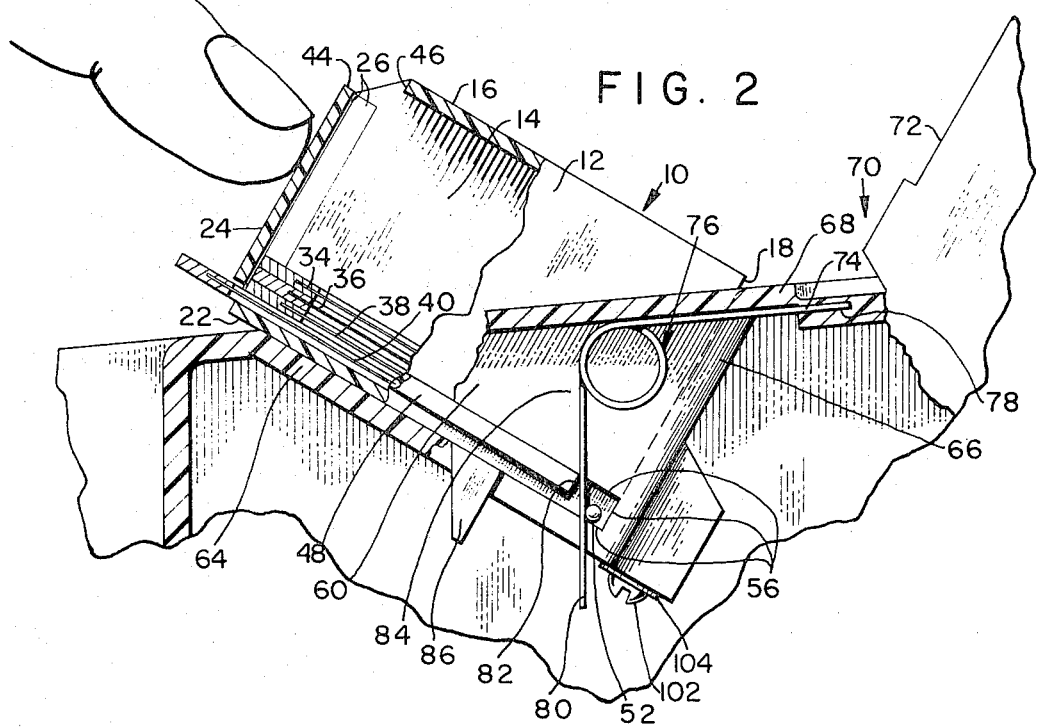
FIG. 2 shows the position of the slide box, the spring biasing means and the detent when the rear wall of the slide box has been pushd from the position in FIG. 1 into contact with rear wall that forms the notched out cavity.

By applying a small amount of finger pressure to the front of the box 10 this box can be moved from the static position shown in FIG. 1 against the bias of spring 68 to the position shown in FIG. 2.

As the aforementioned action takes place the ribs 48, 50 positioned as guide rails on the opposite sides of the box 10 will be moved along and towards the inner ends of the slotted wall portions 56, 58 of the viewer 70.

The inner ends 82, 97 of the taper ribs 48, 50 on the box 10 are also brought into contact with the ends 80, 92 of the springs 76, 88 and causes energy to be stored therein as the box 10 is moved between the position shown in FIGS. 1 and 2.

A wall 98 forming a T-shaped slot in the box 10 and an associated T-shaped pusher 100 protruding from the viewer 70 is employed to keep the sides of the box 10 in sliding alignment with their associated sidewalls 60, 62 that form the notched out housing portion of the viewer 70 as the box is moved between the static FIG. 1 position and the position shown in FIG. 2.

As is best shown in FIG. 3 the pusher 100 also serves another useful purpose in that its outer end engages the inner end of each slide as it reaches the inner bottom surface of the box 10 and as the box is moved between the FIG. 1 and FIG. 2 positions.

FIG. 3 shows an example of how this pusher 100 engages a bottom rear edge of a slide, for example slide 40, and retains the slide in a fixed position on the box 10 as the other slides 34 – 38 therein are moved between the previously described position shown in FIGS. 1 and 2.

It can thus be seen that only the front marginal edge of the slide will be allowed to project out of the front wall 24 of the box 10, between the space formed between the lower edge of door 24 and the bottom wall 22 of box 10, when the box 10 is moved to the position shown in FIGS. 2 and 3.

The bottom slide 40 can be removed from box 10 by merely engaging the marginal mounting portion with a thumb and forefinger of the right hand while a slight pushing pressure of a finger of the left hand retains the box in the position shown in FIG. 3.

Since the aforementioned construction will not allow fingers to be engaged with the transparent emulsion side of the slide, no fingerprints will be imprinted on the transparent portion of the slide.

Another manner in which a slide 40 in the bottom of the box 10 can be removed therefrom is to allow the finger pressure being applied to the box 10 as shown in FIG. 3 to be released so that the previously mentioned energy that is stored in the springs 76, 88 and their associated spring ends 80, 92 can be applied to the ends 82, 97 of the ribs 48, 50 to return the box to the static position as shown in FIG. 4.

In the Figure 4 position the bottom slide 40 will be insubstantially the same extended position as that shown in FIG. 3.

By contacting only the marginal mounting surfaces of this slide 40 in the aforementioned manner it can thus be removed when the slide box 10 is in the FIG. 4 position and this slide removing operation can be done without allowing the operator to leave a print of his fingers on the emulsion side of the slide 40.

It should be understood that the aforementioned slide dispensing operation can be repeated until all the individual slides in the box have been successively dispensed in the aforementioned manner, shown in the viewer 70 and returned to the slide box 10 if for example it is desired to use them at a future time for showing on the viewer 70 or in a slide projector.

If it is decided not to select a slide that has been used in the viewer for a future slide showing that slide can then be inserted in another slide box, whose construction is identical to the previously described slide box 10.

The embodiments of the invention in which an exclusive property or privileges claimed are as follows:

1. A photographic slide dispensing apparatus comprising, a box for holding a stack of slides therein, said box having separate slots in the top and bottom front wall and rear bottom portions, a support member having an inclined recess for slidably receiving and supporting said box thereon, said support member having a pusher member extending through said slot in the rear bottom of said box to guide the latter for movement into said inclined recess, said pusher abutting against the bottom one of said slides in said box whereby upon movement of said box into said recess an edge portion of said bottom slide is caused to extend through the said bottom slot in the front wall of said box.

2. A slide dispensing apparatus comprising, a box for supporting a stack of slides therein and having separate apertures in the base and front wall portion thereof, a housing, a cavity formed by a wall portion of the housing for slidably receiving and supporting said box thereon, said housing having a member protruding through said apertured wall portion in the base of said box to guide said box as the box is slidably moved into said cavity and to abut against a bottom one of said slides in said box whereby upon movement of said box into said cavity an edge of said bottom slide is caused to protrude through the aperture in said front wall and wherein a spring biasing means is mounted in said housing, a projecting means is mounted on the box to movably engage and store energy in the spring biasing means while the box is moved by applying a force thereto in a direction toward the said member and to effect the release of the energy stored in said spring and allow the spring to return the box to its original position when the force being applied to the box is released, and a detent cooperating with said spring biasing means to allow limited movement only of said box out of said recess.

* * * * *